US008544613B2

(12) United States Patent
Cantoni et al.

(10) Patent No.: US 8,544,613 B2
(45) Date of Patent: Oct. 1, 2013

(54) DISC BRAKING SYSTEM FOR A VEHICLE COMBINING SERVICE AND PARKING BRAKE

(75) Inventors: Carlo Cantoni, Bergamo (IT); Enrico Battista Ongaretti, Bergamo (IT); Tomasz Grabiec, Bergamo (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 759 days.

(21) Appl. No.: 12/089,340

(22) PCT Filed: Oct. 5, 2005
(Under 37 CFR 1.47)

(86) PCT No.: PCT/IT2005/000575
§ 371 (c)(1),
(2), (4) Date: Nov. 12, 2008

(87) PCT Pub. No.: WO2007/039922
PCT Pub. Date: Apr. 12, 2007

(65) Prior Publication Data
US 2010/0032250 A1  Feb. 11, 2010

(51) Int. Cl.
*F16D 55/00* (2006.01)
*F16D 55/08* (2006.01)
(52) U.S. Cl.
USPC .................................. 188/73.31; 188/73.32
(58) Field of Classification Search
USPC .............. 188/72.1, 73.2, 73.31, 73.32, 73.39, 188/73.43, 73.44, 73.45
See application file for complete search history.

(56) References Cited

U.S. PATENT DOCUMENTS

| 3,321,049 A | * | 5/1967 | Swift | 188/71.9 |
| 4,064,974 A | * | 12/1977 | Filderman | 188/71.3 |
| 4,505,363 A | * | 3/1985 | Herbulot et al. | 188/72.5 |
| 4,784,241 A | | 11/1988 | Temple et al. | |

(Continued)

FOREIGN PATENT DOCUMENTS

DE   2718003 A  * 10/1978
WO   WO 88/04741 A1   6/1988

OTHER PUBLICATIONS

Int'l Search Report issued in related International Application No. PCT/IT2005/000575.

*Primary Examiner* — Melody Burch
(74) *Attorney, Agent, or Firm* — Robert E. Alderson Jr.

(57) ABSTRACT

A disc braking system (10) for a vehicle comprises a service caliper (12) suitable to be arranged astride a disc (14) rotating about an axis (16), said service caliper comprising at least one couple of service pads (18, 20). The system further comprises a floating parking caliper (30) suitable to be arranged astride the disc (14) and comprising a least one couple of parking pads (32, 34) housed in a floating structure (36) of the parking caliper. The floating structure comprises a side portion (38) and a bracket portion (40) extending from the side portion (38) in the axial direction to the disc (14). An individual mount structure (22) is provided which is suitable to be mounted on a fixed portion of the vehicle, and suitable to receive the couple of service pads (18, 20) and the floating parking caliper (30), which is slidably mounted thereon. Each parking pad (32, 34) is slidably inserted within a respective housing (48) of the mount structure (22) that is circumferentially defined by containment walls (50) being formed in the mount structure (22) and suitable to contain circumferentially opposed sides (52) of the parking pads (32, 34).

20 Claims, 8 Drawing Sheets

(56) References Cited

U.S. PATENT DOCUMENTS 4,993,519 A * 2/1991 Thioux ............... 188/71.3
5,921,354 A * 7/1999 Evans ............... 188/73.2
2002/0007989 A1 * 1/2002 Matsuishi ............... 188/73.39
2005/0000757 A1 1/2005 Wang

* cited by examiner

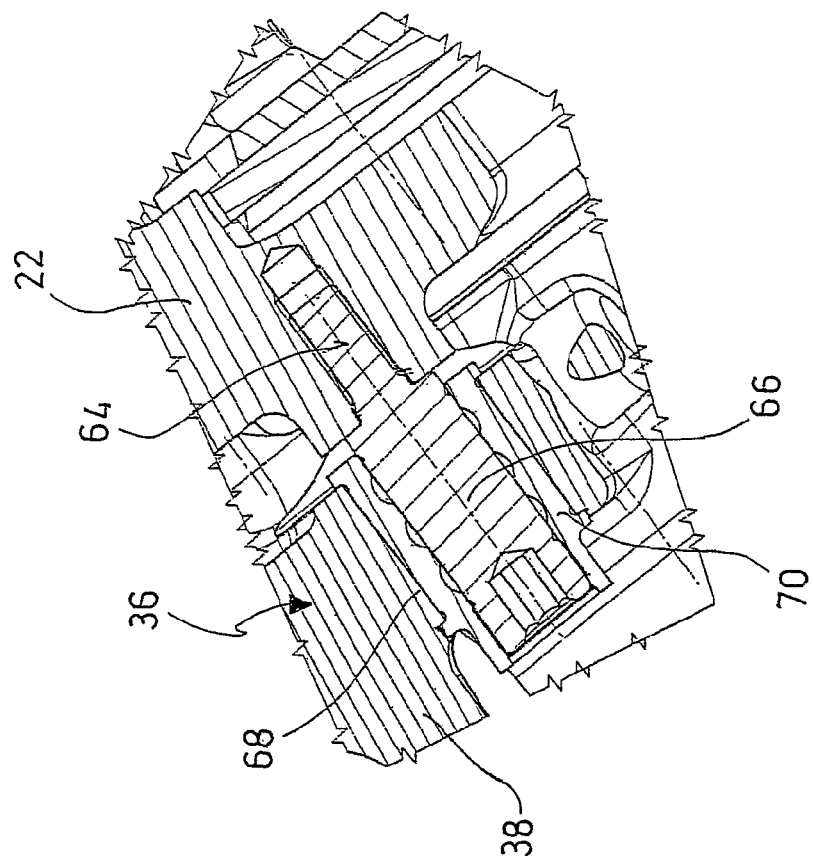
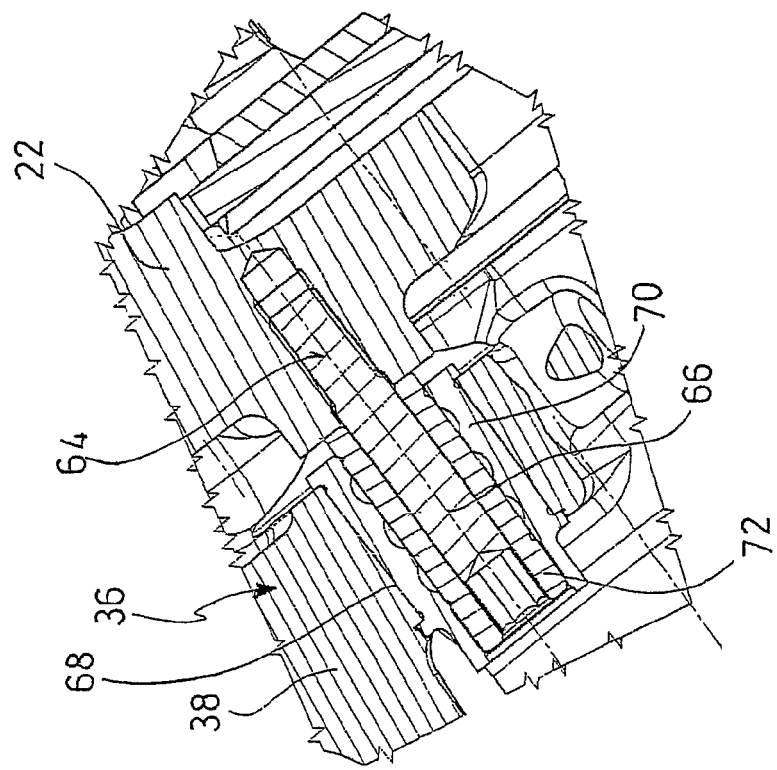

DISC BRAKING SYSTEM FOR A VEHICLE COMBINING SERVICE AND PARKING BRAKE

CROSS REFERENCE TO RELATED APPLICATIONS

This application claims priority under 35 U.S.C. §371 to International Application No. PCT/IT2005/000575, filed Oct. 5, 2005, of which application is expressly incorporated herein by reference in its entirety.

The object of the present invention is a disc braking system for a vehicle.

A braking system for a vehicle is known to generally perform both the function of service brake and the function of parking brake.

In some cases, both functions are performed by an individual caliper, the so-called combined caliper, which is differently acted upon according to the desired function, for example by providing a hydraulic actuator for the service brake function and a mechanical actuator for the parking brake function.

On the other hand, the present invention is addressed to braking systems where the two functions are performed by two different calipers, which are operated in a separate manner.

Known systems have some drawbacks, in that if two calipers for both functions are provided, then at least one support for each of the calipers is to be provided as well, consequently the resulting structure is complicated and difficult to mount in the narrow space available. Furthermore, the braking system is particularly expensive due to the complicated structure, the provision of at least two supports, and the shape of the caliper.

The problem at the heart of the present invention is to provide a disc braking system for a vehicle having such structural and functional characteristics to overcome said drawbacks mentioned with reference to prior art.

This problem is solved by a disc braking system in accordance with claim 1.

Further characteristics and the advantages of the disc braking system according to the invention will be understood from the description set forth below of a preferred exemplary embodiment thereof, which is given by way of non-limiting illustration, with reference to the annexed figures, in which:

FIG. 3 shows an enlargement of the detail III from FIG. 2;

FIG. 4 shows an enlargement of the detail III from FIG. 2 according to a different embodiment;

Figure 1:
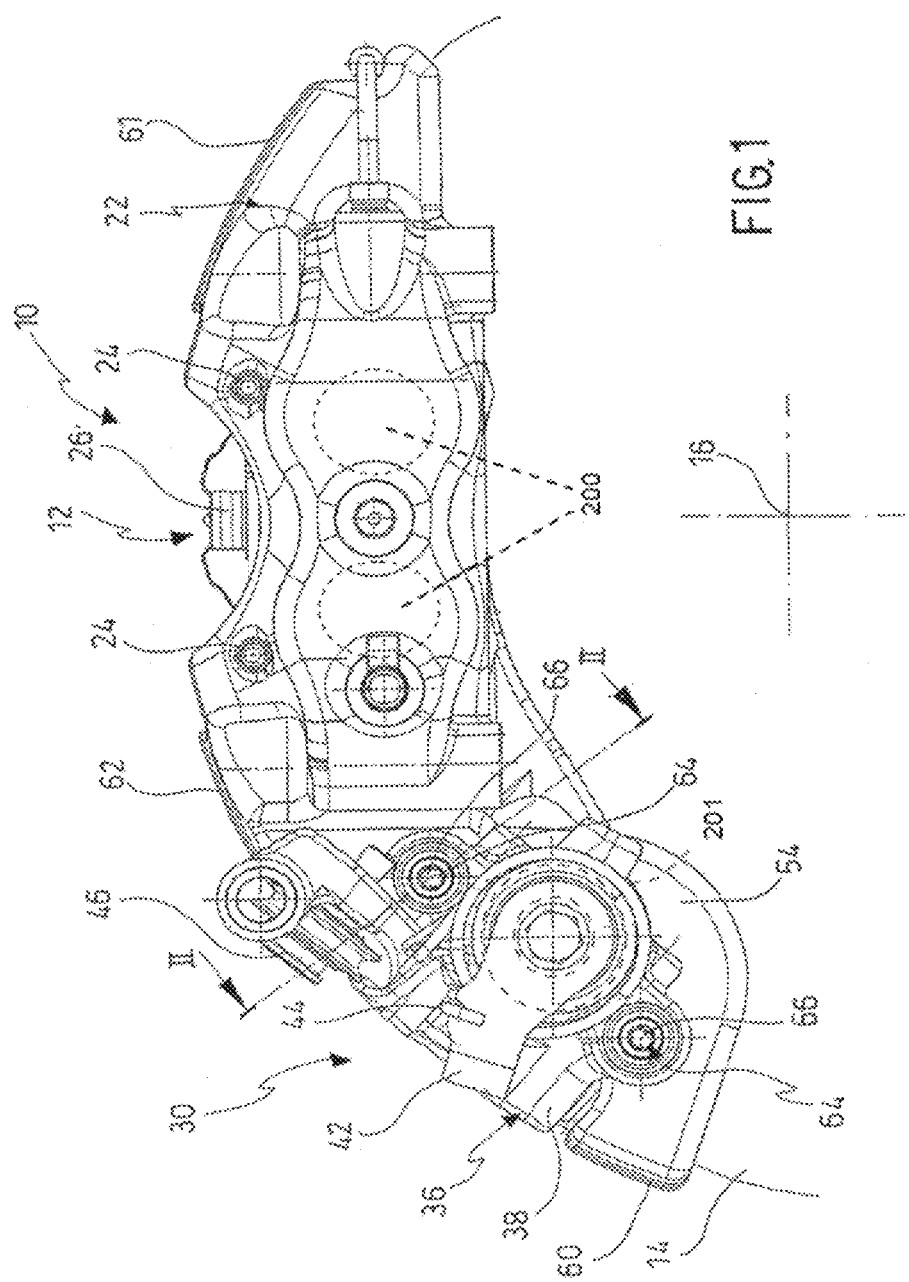
FIG. 1 shows a view of a braking system in accordance with the present invention.

With reference to said figures, a disc braking system for a vehicle in accordance with the present invention has been overall designated with 10.

A service caliper which is suitable to be arranged astride a disc 14 rotating about an axis 16 has been designated with 12. The service caliper comprises at least one couple of service pads 18, 20.

By axial is meant herein below a direction parallel to or coincident with the rotation axis of the disc, whereas by circumferential is meant a direction tangential to the disc.

Preferably, the service caliper 12 is a stationary caliper in which a body 22 houses the couple of service pads 18, 20 and thrust means 200, preferably of the hydraulic type, operating on both service pads. In the example as illustrated two hydraulic-operated pistons 200 act on each service pad.

In accordance with a possible embodiment, the service pads are inserted in respective housings of the body 22 and supported by pins 24 being axially arranged relative to the disc. With reference to the example illustrated, a spring 26 is arranged between the pads and the pins to apply a thrust on the pads maintaining the latter constantly moved away from the disc and constantly moved towards the disc axis.

The body 22 is mounted on a vehicle fixed member, by means of couplings 28 for example of the so-called radial type such as illustrated in the figures.

The braking system according to the present invention further comprises a floating parking caliper 30, suitable to be arranged astride the disc and comprising at least one couple of parking pads 32, 34.

The parking pads are associated with a floating structure 36 of the parking caliper, for example by means at least one pin 37. The floating structure comprises a side portion 38 and a bracket portion 40 extending from the side portion 38 in the axial direction relative to the disc.

Particularly, a first parking pad, or active pad, has been designated with 32, which is directly urged against the disc by the thrust means 201 housed in the side portion of the floating structure. Furthermore, with 34 has been designated a second parking pad, or reaction pad that is opposed to the first pad 32 and urged to the disc by the bracket portion 40 of the floating structure 36 when the floating structure is sliding following the reaction resulting from the interaction between the first pad and the disc.

The thrust means 201 comprise a piston, not illustrated, which is housed within the side portion 38 of the floating structure 36 and acts on the active pad 32. In accordance with the embodiment illustrated, the piston 201 is operated by a lever 42 by means of kinematism provided within the side portion. The lever 42 is held in the rest position by a spring 44 and rotated to the braking position by a cable, not illustrated, for example returned by means of a pulley 46 and operatively linked for example with a control feature provided within the passenger compartment.

Advantageously, the braking system comprises an individual mount structure suitable to be mounted on a fixed portion of the vehicle and suitable to receive the couple of service pads 18, 20 and the floating parking caliper 30, which is slidably mounted thereon. With reference to the example illustrated, the mount structure consists of the body 22 of the service caliper 12 extending until it houses the parking caliper 30, particularly the floating structure 36 of the parking caliper 30 and the respective parking pads 32, 34.

Particularly, each parking pad 32, 34, besides being associated with the floating structure 36 of the parking caliper 30, is slidably inserted within a respective housing 48 in the mount structure being circumferentially defined by containment walls 50 formed in the mount structure and suitable to contain circumferentially opposed sides 52 of the parking pads 32, 34.

Preferably, the mount structure comprises a first side wall 54, or side wall on the hub side, which is substantially transversal to the axis 16 of the disc and suitable to be arranged between the active parking pad 32 and the side portion 38 of the parking caliper thereby defining the housing 48 of the active pad 32 in the axial direction to the disc. The containment walls 50 axially extend from the side wall on the hub side 54.

The side wall on the hub side comprises an opening 56 allowing the interaction of the thrust means piston 201 with the active pad 32 and extends substantially parallel to the active pad, between the containment walls 50.

In accordance with a possible embodiment, such as illustrated in the annexed drawings, the mount structure comprises a second side wall 58, or side wall on the wheel side, substantially transversal to the axis 16 of the disc and suitable to be arranged axially outside the bracket portion 40 and reaction parking pad 34 thereby defining the housing 48 of the reaction pad and bracket portion in the axial direction to the disc. The containment walls 50 axially extend from the side wall on the wheel side 58.

In accordance with a possible embodiment as illustrated, the mount structure envelops the couple of parking pads 32, 34 and a length of the bracket portion 40 both in a parallel direction to the disc and in an axial direction to the disc.

Particularly, the side wall on the hub side 54 and the side wall on the wheel side 58 are joined by a connecting wall 60 extending astride the disc, at an end of the mount structure 22. Particularly, by providing a service caliper with a body 22 having an end connecting wall 61, the connecting wall 60 is formed at an end of the body 22 opposite to the service pads.

Advantageously, a further connecting wall 62 extends astride the disc, between the service caliper and the parking caliper.

The side wall on the hub side, the side wall on the wheel side, the connecting wall 60 and the further connecting wall 62, if provided, envelop the floating structure and parking calipers such as to define a compact, box-like structure particularly resistant to the constraints involved.

In accordance with a possible embodiment, the floating parking caliper, and particularly the floating structure 36 is slidable along guides 64 that are interposed between the floating structure 36 and the mount structure, preferably the side wall on the hub side 54 of the mount structure. Preferably, the floating parking caliper slides on two guides 64 arranged at circumferentially opposed parts relative to the floating parking caliper.

Advantageously, the guides are screwed in the mount structure and extend in a sliding portion 66 within sliding seat s 68 of the floating parking caliper. Particularly, the guides 64 are screwed outside the mount structure and are inserted in sliding seats 68 of the side portion 38 of the floating structure 36.

A sliding bush of a respective sliding seat 68 has been designated with 70.

Figure 2:
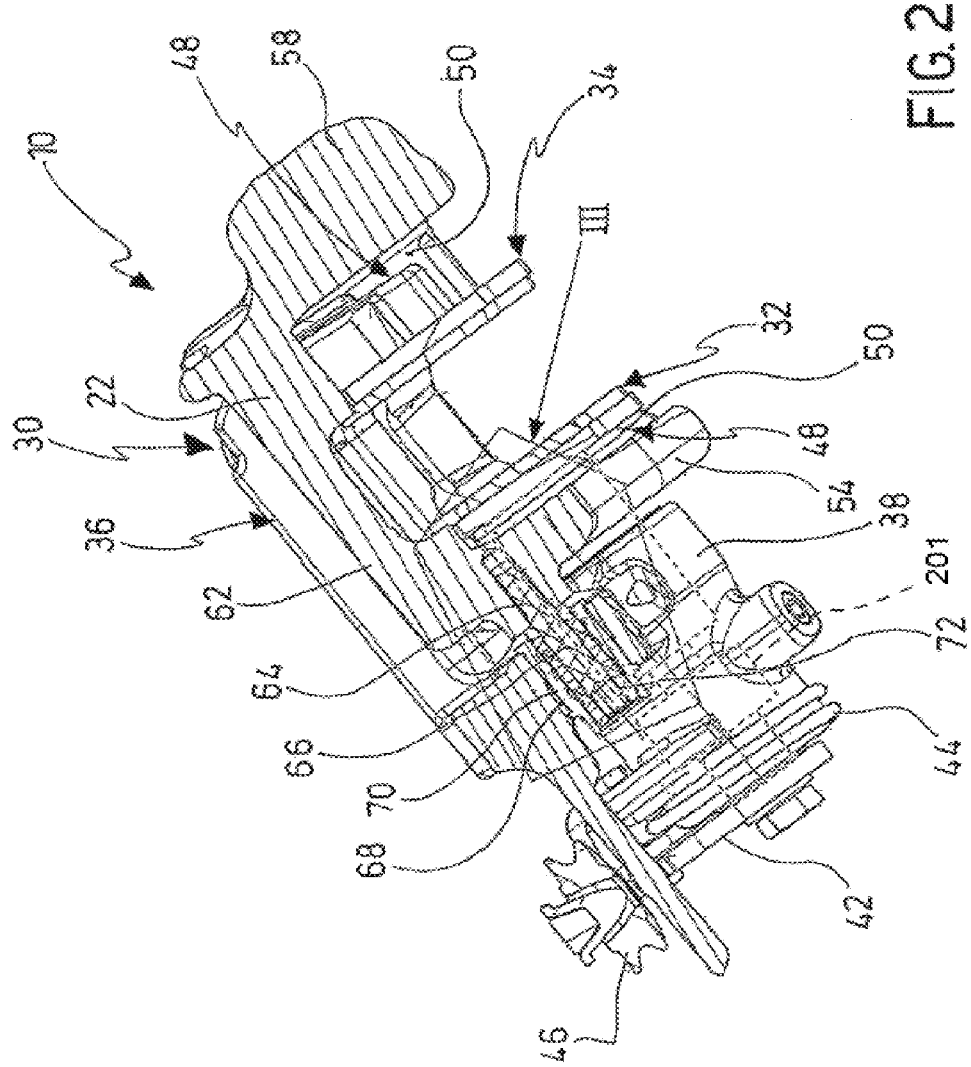
FIG. 2 shows a sectional view of the braking system from FIG. 1 according to the line II-II from FIG. 1.
Figure 5:
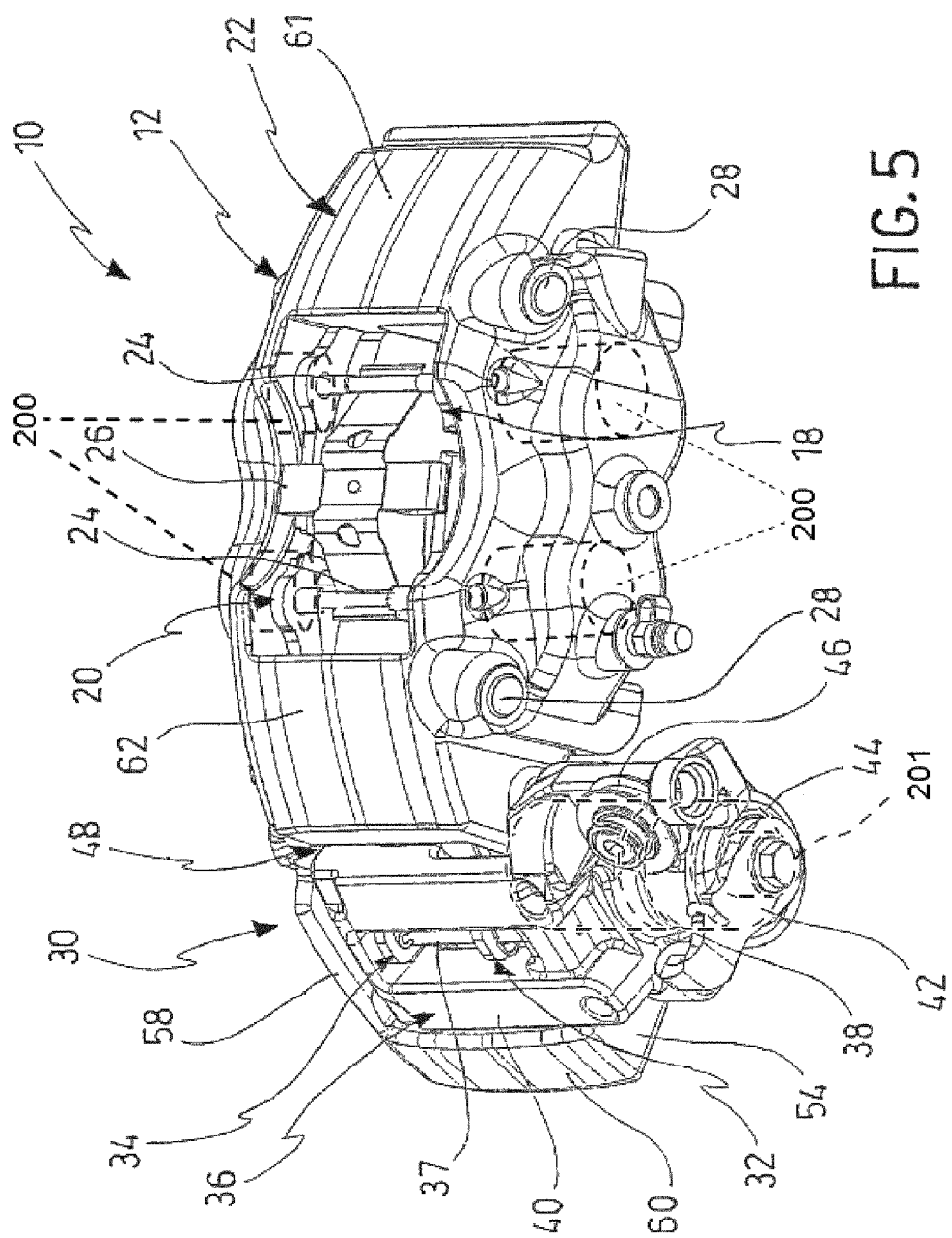
FIG. 5-7 show perspective views according to various points of view of the braking system according to the present invention.
Figure 6:
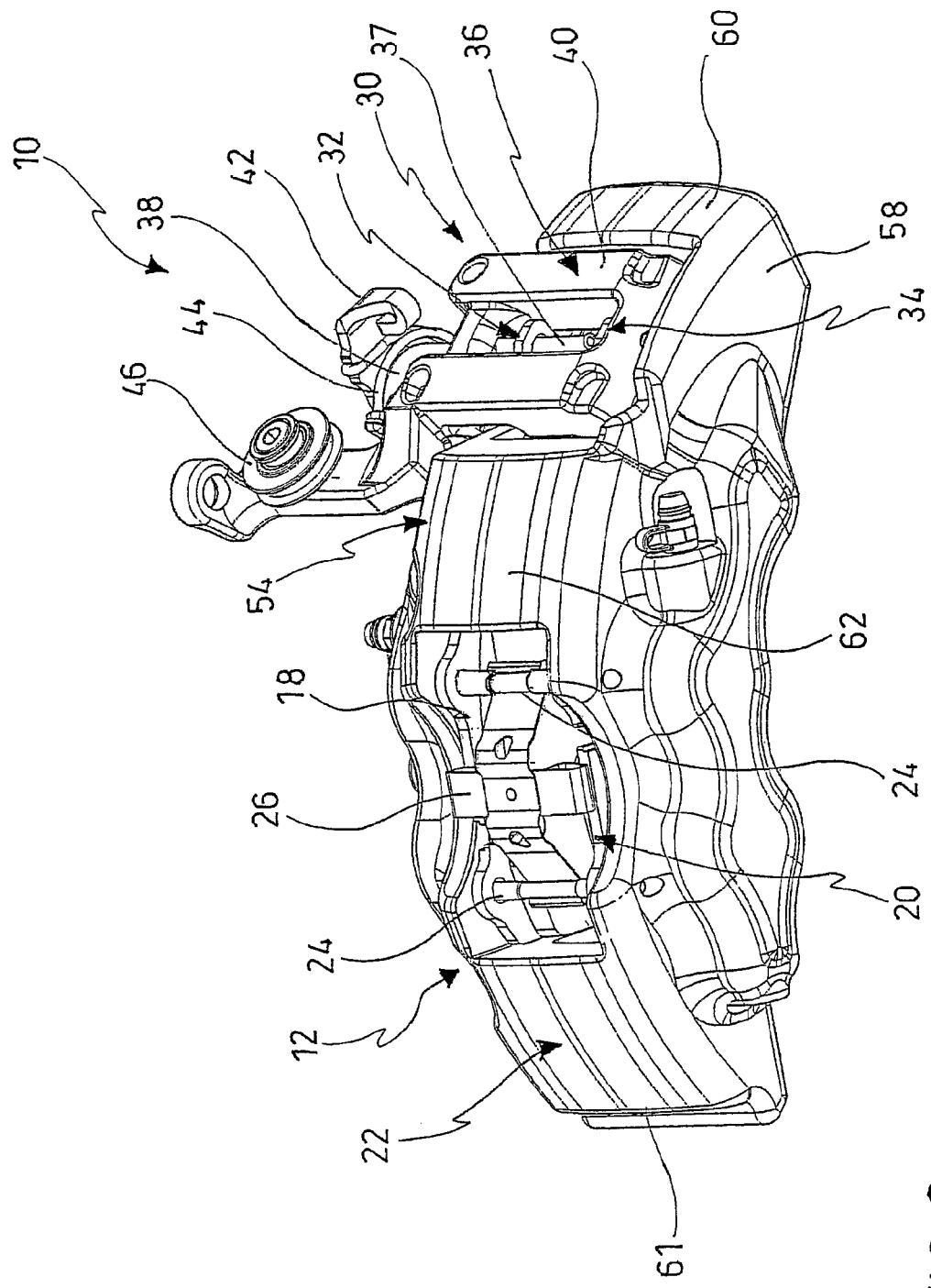
Figure 7:
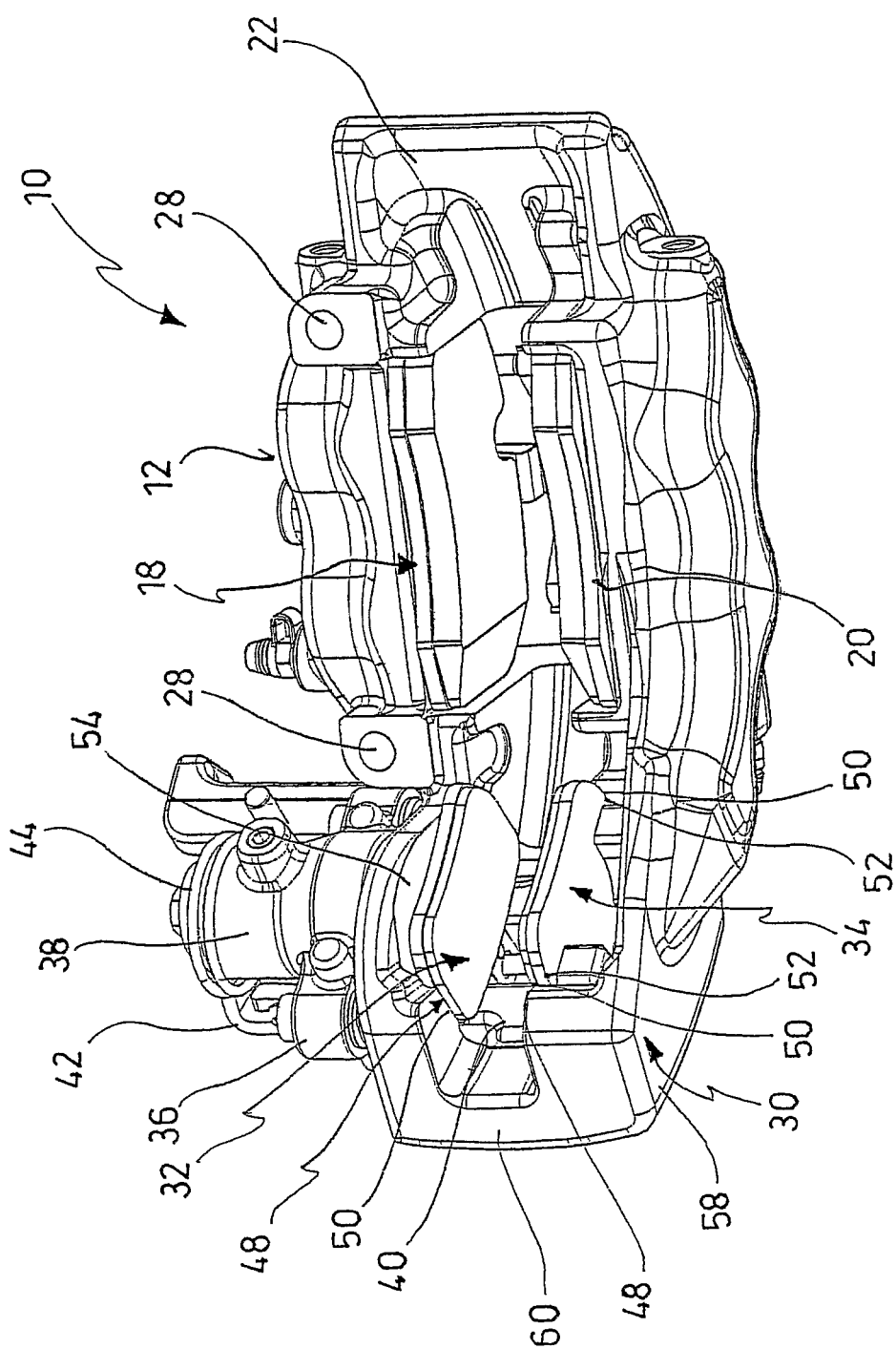
Figure 8:
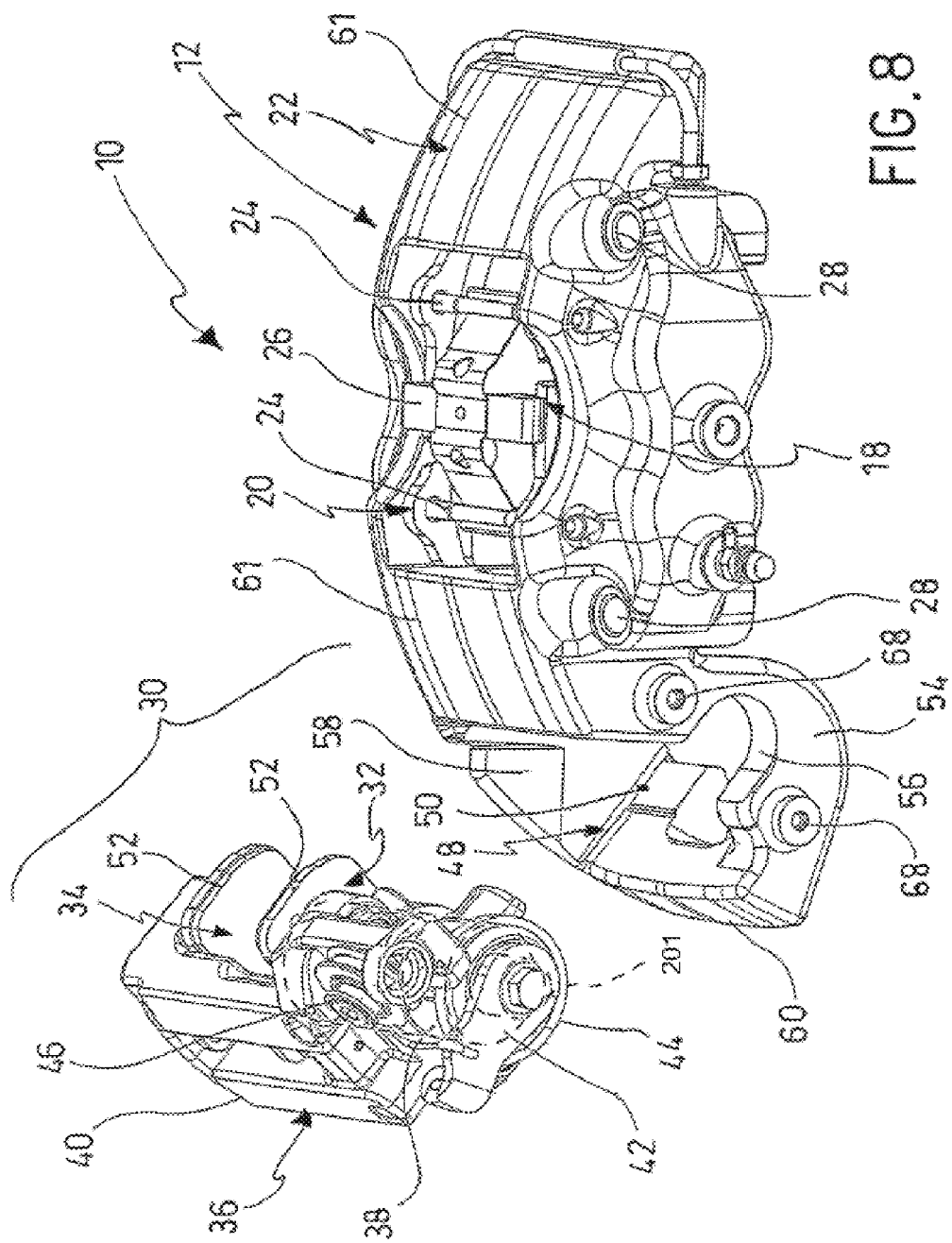
FIGS. 8 and 9 shows perspective cut-away views according to various points of view of the braking system in accordance with the present invention.
Figure 9:
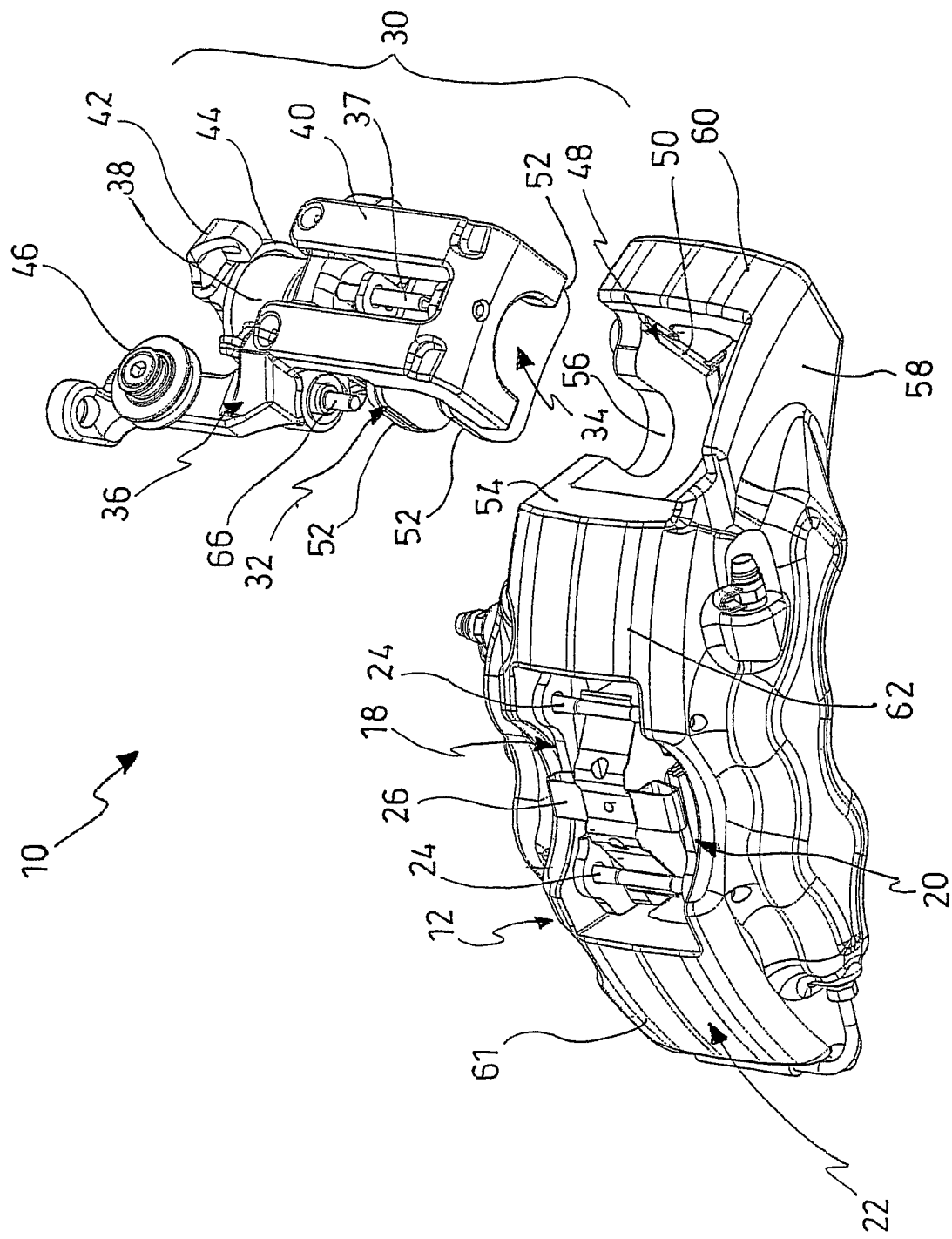

In accordance with a possible embodiment, such as illustrated in FIGS. 2 and 3, at least the slide portion 66 comprises a sleeve 72 being inserted externally to and coaxially with the slide portion of the guide 64. Preferably, the sleeve is made of steel. Alternatively, FIG. 4 illustrates a guide 64 suitable to slide directly within the bush 70 of the sliding seat 68, without the sleeve being interposed therebetween.

The operation mode of the braking system such as described above is described below.

The service caliper is operated by acting on a control provided within the vehicle, generally the brake pedal. In the case as illustrated in the figures, in which the service caliper is a hydraulically-operated stationary caliper, the pressure exerted on the brake pedal increases the pressure in the hydraulic system such that the respective pistons 200 provided within the body 22 urge the service pads against the disc.

The parking caliper is operated by acting on a control provided within the vehicle, for example in the form of a lever, though further controls may also be provided such as described below. With reference to the example such as illustrated, the lever 42 rotates contrary to the spring 44 following the action that has been exerted for example by a cable being connected to the control inside the vehicle, not illustrated. By rotating the lever 42 a thrust is exerted on the piston 201 provided within the side portion 38 of the parking caliper which directly urges the active pad 32 against the disc. Following the reaction of the active pad 32 with the disc, the floating structure 36 of the parking caliper shifts along the guides 64 thereby moving the reaction pad 34 against the disc. By releasing the control, the lever 42 returns in the rest position by the action of the spring 44.

From what has been stated above, it may be appreciated how the provision of a braking system according to the present invention allows one to provide a compact system particularly suitable to withstand constraints such as due to the effect of dragging the disc on the pads. Due to the provision of one single mount structure and the advantageous shape thereof, the braking system according to the present invention is particularly simple to manufacture, assemble, and cost-effective as a whole.

Furthermore, with the braking system described above the body of a stationary service caliper may be used to house the floating parking caliper and ensure a suitable reaction to the constraints exerted on the parking pads. The body of the service caliper is thus compact and allows the visual appearance of the whole braking system to be also improved.

It is understood that variations and/or additions to what has been described and illustrated above may also be provided.

Alternatively to what has been depicted in the figures, whether a side wall on the hub side is provided or not, the mount structure may be provided to comprise a side wall on the wheel side that is substantially transversal to the disc axis and suitable to be arranged axially outside the bracket portion and the reaction parking pad thereby axially defining the housing of the reaction pad and the bracket portion. The containment walls axially extend from the side wall on the wheel side.

In accordance with a different embodiment, whether a side wall on the hub side and/or a side wall on the wheel side are provided or not, the mount structure advantageously envelops the couple of parking pads and a length of the bracket portion both in the parallel direction to the disc and in the axial direction to the disc.

The service caliper may be provided in a different manner from what has been described and illustrated above, for example it may be provided by means of a floating caliper. In this case, the mount structure which is the same for both the service and parking calipers is the fixed structure on which there are slidably mounted both the service and the stationary calipers.

Furthermore, the thrust means of the service caliper may be different from those described, for example by comprising an electric actuator, or of a different nature. In addition, in the case of hydraulic operation, a number and arrangement of pads and pistons may be provided other than that illustrated above.

The assembly of the service calipers may be different from that illustrated, for example by not providing the pins 24 or the spring 26 or by providing them in shape, number and/or arrangement other than those illustrated above. The pin 37 of the parking caliper may be also provided in shape, number and/or arrangement other than those illustrated above, for example by providing two pins.

In the case of a stationary service caliper, the body may be connected to the vehicle in any manner, for example with a different arrangement of the couplings.

According to possible alternatives, the floating parking caliper may be either operated by means of a standard lever, such as described above, or with other types of actuators, such as electric drive-in probe or electric motor.

The present invention relates to the arrangement of a first and/or a second side wall such as described above, either on the wheel-side or hub-side.

Alternatively to what has been illustrated in the figures, the opening 56 allowing the interaction of the thrust means piston with the active pad 32 may be provided with a hole in the side wall on the hub side.

The mount structure according to the present invention may be provided either as one piece or several pieces assembled to each other.

To the preferred embodiment of the disc braking system such as described above, those skilled in the art, aiming at satisfying contingent and specific requirements, will be able to carry out a number of modifications, adaptations and replacements of elements with others functionally equivalent, without however departing from the scope of the following claims.

The invention claimed is:

1. A disc braking system for a vehicle comprising:
    a stationary service caliper suitable to be arranged astride a disc rotating about an axis, said service caliper comprising an individual mount structure suitable to be assembled on a fixed portion of a vehicle and comprising at least one couple of service pads, wherein the mount structure is formed as a single piece and consists of a portion of the body of the service caliper,
    a floating parking caliper suitable to be arranged astride the disc and comprising at least one couple of parking pads housed in a floating structure of said parking caliper, wherein a first parking pad, or active pad, is directly urged to the disc by thrust means housed in a side portion of the floating structure and a second parking pad, or reaction pad, opposed to the first pad is urged against the disc by a bracket portion of the floating structure when the floating structure is sliding following the reaction resulting from the interaction of the first pad with the disc, said bracket portion extending from said side portion in the axial direction to the disc,
    said individual mount structure of the service caliper having a seat to receive the floating parking caliper, the parking caliper being directly supported by the service caliper, the mount structure of the service caliper further comprising housings to slidably receive each of said parking pads, the housings being circumferentially defined by containment walls which are formed in the mount structure of the service caliper, said containment walls being configured to contain the circumferentially opposed sides of the parking pads
    wherein said mount structure further defines the caliper body suitable to house the service pads and means for urging the service pads against the disc.

2. The disc braking system according to claim 1, wherein said mount structure comprises a side wall on a hub side that is substantially transversal to the axis of the disc and suitable to be arranged between the active parking pad and the side portion of the parking caliper thereby axially defining said housing of the active pad, said containment walls axially extending from said side wall on the hub side.

3. The disc braking system according to claim 2, wherein said mount structure comprises a side wall on a wheel side substantially transversal to the axis of the disc and suitable to be axially arranged outside the bracket portion and the reaction parking pad thereby axially defining said housing of the reaction pad and bracket portion, said containment walls axially extending from said side wall on the wheel side.

4. The disc braking system according to claim 3, wherein said mount structure envelopes the couple of parking pads and a length of the bracket portion both in the parallel direction to the disc and in the axial direction to the disc.

5. The disc braking system according to claim 3, wherein said side wall on the hub side and said side wall on the wheel side are joined by a connecting wall extending astride the disc, at an end of the mount structure.

6. The disc braking system according to claim 3, wherein said floating parking caliper is slidable on at least one guide being interposed between the floating structure and the side wall on the hub side of the mount structure.

7. The disc braking system according to claim 6, wherein said at least one guide comprises two guides being arranged at circumferentially opposed parts of the floating parking caliper.

8. The disc braking system according to claim 6, wherein said at least one guide is screwed to the mount structure and extends with a sliding portion provided within sliding seats of the floating parking caliper.

9. The disc braking system according to claim 8, wherein said sliding portion comprises a sleeve being inserted externally of and coaxially with the sliding portion of said at least one guide.

10. The disc braking system according to claim 1, wherein said mount structure comprises a side wall on a wheel side substantially transversal to the axis of the disc and suitable to be arranged axially outside the bracket portion and the reaction parking pad thereby axially defining said housing of the reaction pad and bracket portion, said containment walls axially extending from said side wall on the wheel side.

11. Disc braking system according to claim 1, wherein said mount structure envelops the couple of parking pads and a length of the bracket portion both in the parallel direction to the disc and in the axial direction to the disc.

12. The disc braking system according to claim 2, wherein said mount structure envelops the couple of parking pads and a length of the bracket portion both in the parallel direction to the disc and in the axial direction to the disc.

13. The disc braking system according to claim 5, wherein said side wall on the hub side and said side wall on the wheel side are linked by another connecting wall extending astride the disc between the service caliper and the parking caliper.

14. Disc braking system according to claim 5, wherein the side wall on the hub side, the side wall on the wheel side, and the connecting wall envelop both the floating structure and the parking caliper thereby defining a compact structure being resistant to constraints exerted on the parking pads.

15. Disc braking system according to claim 13, wherein the side wall on the hub side, the side wall on the wheel side, and the connecting envelop both the floating structure and the parking caliper thereby defining a compact structure being resistant to constraints exerted on the parking pads.

16. The disc braking system according to claim 4, wherein said side wall on the hub side and said side wall on the wheel side are joined by a connecting wall extending astride the disc, at an end of the mount structure.

17. The disc braking system according to claim 4, wherein said floating parking caliper is slidable on guides being interposed between the floating structure and the side wall on the hub side of the mount structure.

18. The disc braking system according to claim 5, wherein said floating parking caliper is slidable on guides being interposed between the floating structure and the side wall on the hub side of the mount structure.

19. The disc braking system according to claim 16, wherein said floating parking caliper is slidable on guides being interposed between the floating structure and the side wall on the hub side of the mount structure.

20. The disc braking system according to claim 7, wherein said guides are screwed to the mount structure and extend with a sliding portion provided within sliding seats of the floating parking caliper.

* * * * *